(12) United States Patent
Barnett

(10) Patent No.: US 6,292,874 B1
(45) Date of Patent: *Sep. 18, 2001

(54) MEMORY MANAGEMENT METHOD AND APPARATUS FOR PARTITIONING HOMOGENEOUS MEMORY AND RESTRICTING ACCESS OF INSTALLED APPLICATIONS TO PREDETERMINED MEMORY RANGES

(75) Inventor: Philip C. Barnett, West End Witney (GB)

(73) Assignee: Advanced Technology Materials, Inc., Danbury, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/420,318

(22) Filed: Oct. 19, 1999

(51) Int. Cl.$^7$ ................................................. G06F 12/02
(52) U.S. Cl. ............................. 711/153; 711/173; 703/23
(58) Field of Search ................................. 711/115, 153, 711/163, 173; 713/200; 703/23, 24

(56) References Cited

U.S. PATENT DOCUMENTS

| | | | | |
|---|---|---|---|---|
| 4,930,129 | * | 5/1990 | Takahira | 714/766 |
| 5,206,938 | * | 4/1993 | Fujioka | 711/200 |
| 5,500,949 | * | 3/1996 | Saito | 711/100 |
| 5,517,014 | * | 5/1996 | Iijima | 235/492 |
| 5,890,199 | * | 3/1999 | Downs | 711/106 |
| 5,912,453 | * | 6/1999 | Gungl et al. | 235/492 |
| 5,912,849 | * | 6/1999 | Yasu et al. | 365/195 |

* cited by examiner

Primary Examiner—Hiep T. Nguyen
(74) Attorney, Agent, or Firm—Oliver A. Zitzmann; Kevin M. Mason

(57) ABSTRACT

A memory management unit is disclosed for a single-chip data processing circuit, such as a smart card. The memory management unit (i) partitions a homogeneous memory device to achieve heterogeneous memory characteristics for various regions of the memory device, and (ii) restricts access of installed applications executing in the microprocessor core to predetermined memory ranges. The memory management unit provides two operating modes for the processing circuit. In a secure kernel mode, the programmer can access all resources of the device including hardware control. In an application mode, the memory management unit translates the virtual memory address used by the software creator into the physical address allocated to the application by the operating system in a secure kernel mode during installation. The memory management unit implements memory address checking using limit registers and translates virtual addresses to an absolute memory address using offset registers. The memory management unit loads limit and offset registers with the appropriate values from an application table to ensure that the executing application only accesses the designated memory locations. The memory management unit can also partition a homogeneous memory device, such as an FERAM memory device, to achieve heterogeneous memory characteristics normally associated with a plurality of memory technologies, such as volatile, non-volatile and program storage (ROM) memory segments. Once partitioned, the memory management unit enforces the appropriate corresponding memory characteristics for each heterogeneous memory type.

18 Claims, 4 Drawing Sheets

| APPL'N ID | COR | CLR | DLR | VDLR | VDOR | NVOR |
|---|---|---|---|---|---|---|
| 1 | | | | | | |
| 2 | | | | | | |
| ... | | | | | | |
| N | | | | | | |

FIG.3

MEMORY MANAGEMENT METHOD AND APPARATUS FOR PARTITIONING HOMOGENEOUS MEMORY AND RESTRICTING ACCESS OF INSTALLED APPLICATIONS TO PREDETERMINED MEMORY RANGES

FIELD OF THE INVENTION

The present invention relates generally to a memory management system for single-chip data processing circuits, such as a smart card, and more particularly, to a memory management method and apparatus that (i) partitions homogeneous memory devices to achieve heterogeneous memory characteristics and (ii) restricts access of installed applications to predetermined memory ranges.

BACKGROUND OF THE INVENTION

Smart cards typically contain a central processing unit (CPU) or a microprocessor to control all processes and transactions associated with the smart card. The microprocessor is used to increase the security of the device, by providing a flexible method to implement complex and variable algorithms that ensure integrity and access to data stored in non volatile memory. To enable this requirement, smart cards contain non-volatile memory, for storing program code and changed data, and volatile memory for the temporary storage of certain information. In conventional smart cards, each memory type has been implemented using different technologies.

Byte erasable EEPROM, for example, is typically used to store non-volatile data, that changes or configures the device in the field, while Masked-Rom and more recently one-time-programmable read-only memory (OTPROM) is typically used to store program code. The data and program code stored in such non-volatile memory will remain in memory, even when the power is removed from the smart card. Volatile memory is normally implemented as random access memory (RAM). The hardware technologies associated with each memory type provide desirable security benefits. For example, the one-time nature of OTPROM prevents authorized program code from being modified or over-written with unauthorized program code. Likewise, the implementation of volatile memory as RAM ensures that the temporarily stored information, such as an encryption key, is cleared after each use.

There is an increasing trend, however, to utilize homogeneous memory devices, such as ferroelectric random access memory (FERAM), in the fabrication of smart cards. FERAM is a nonvolatile memory employing a ferroelectric material to store the information based on the polarization state of the ferroelectric material. Such homogeneous memory devices are desirable since they are non-volatile, while providing the speed of RAM, and the density of ROM while using little energy. The homogeneous nature of such memory devices, however, eliminates the security benefits that were previously provided by the various hardware technologies themselves. Thus, a need exists for the ability to partition such otherwise homogeneous memory devices into volatile, non-volatile and program storage (ROM) regions with the appropriate corresponding memory characteristics.

U.S. Pat. No. 5,890,199 to Downs discloses a system for selectively configuring a homogeneous memory, such as FERAM, as read/write memory, read only memory (ROM) or a combination of the foregoing. Generally, the Downs system allows a single portion of the memory array to be partitioned as ROM for storing the software code for only an application. In addition, the Downs system does not provide a mechanism for configuring the homogeneous memory to behave like RAM that provides for the temporary storage of information that is cleared after each use. Single-chip microprocessors, such as those used in smart cards, increasingly support multiple functions (applications) and must be able to download an application for immediate execution in support of a given function. Currently, single-chip microprocessors prevent an installed application from improperly corrupting or otherwise accessing the sensitive information stored on the chip using software controls. Software-implemented application access control mechanisms, however, rely on the total integrity of the embedded software, including the software that can be loaded in the field.

Ideally, a system would allow a third party to create an application and load it onto a standard card, which removes the control over the integrity of the software allowing malicious attacks. This may be overcome, for example, by programming an interpreter into the card that indirectly executes a command sequence (as opposed to the microprocessor executing a binary directly). This technique, however, requires more processing power for a given function and additional code on the device which further increases the cost of a cost-sensitive product. A mechanism is required that ensures that every memory transaction made by a loaded application is limited to the memory areas allocated to it. Furthermore, this mechanism needs to function independently of the software such that it cannot be altered by malicious programs. Thus, even malicious software is controlled.

A further need exists for a hardware-implemented access control mechanism that prevents unauthorized applications from accessing stored information, such as sensitive data, and the controlling software of smart cards. Hardware-implementations of an access control mechanism will maximize the security of the single-chip microprocessor, and allow code to be reused, by isolating the code from the actual hardware implementation of the device. Furthermore, a hardware-implemented access control mechanism allows a secure kernel (operating system) to be embedded into the device, having access rights to features of the device that are denied to applications.

SUMMARY OF THE INVENTION

Generally, a memory management unit is disclosed for a single-chip data processing circuit, such as a smart card. The memory management unit (i) partitions a homogeneous memory device to achieve heterogeneous memory characteristics for various regions of the memory device, and (ii) restricts access of installed applications executing in the microprocessor core to predetermined memory ranges. Thus, the memory management unit imposes firewalls between applications and permits hardware checked partitioning of the memory.

The memory management unit provides two operating modes for the processing circuit. In a secure kernel mode, the programmer can access all resources of the device including hardware control. In an application mode, the memory management unit translates the virtual memory address used by the software creator into the physical address allocated to the application by the operating system in a secure kernel mode during installation. The present invention also ensures that an application does not access memory outside of the memory mapped to the application by the software when in secure kernel mode. Any illegal memory accesses attempted by an application will cause a trap, and in one embodiment, the memory management unit restarts the microprocessor in a secure kernel mode, optionally setting flags to permit a system programmer to implement an appropriate mechanism to deal with the exception.

An application table records the memory demands of each application that is installed on the single-chip data processing circuit, such as the volatile, non-volatile and program storage (OTPROM) memory requirements of each application. The memory management unit implements memory address checking using limit registers and translates virtual addresses to an absolute memory address using offset registers. Once the appropriate memory areas have been allocated to each application program, the memory management unit loads limit and offset registers with the appropriate values from the application table to ensure that the executing application only accesses the designated memory locations.

According to another aspect of the invention, the memory management unit partitions a homogeneous memory device, such as an FERAM memory device, to achieve heterogeneous memory characteristics normally associated with a plurality of memory technologies, such as volatile, non-volatile and program storage (ROM) memory segments. Once partitioned, the memory management unit enforces the appropriate corresponding memory characteristics for each heterogeneous memory type. A memory partition control logic is programmed with the required partitioning associated with each portion of the homogeneous memory in order that the homogeneous memory behaves like volatile, non-volatile and program storage (OTPROM) memory technologies, as desired.

A more complete understanding of the present invention, as well as further features and advantages of the present invention, will be obtained by reference to the following detailed description and drawings.

BRIEF DESCRIPTION OF THE DRAWINGS

FIG. 3 is a sample table from the exemplary application table of FIG. 2; and

DETAILED DESCRIPTION

Figure 1:
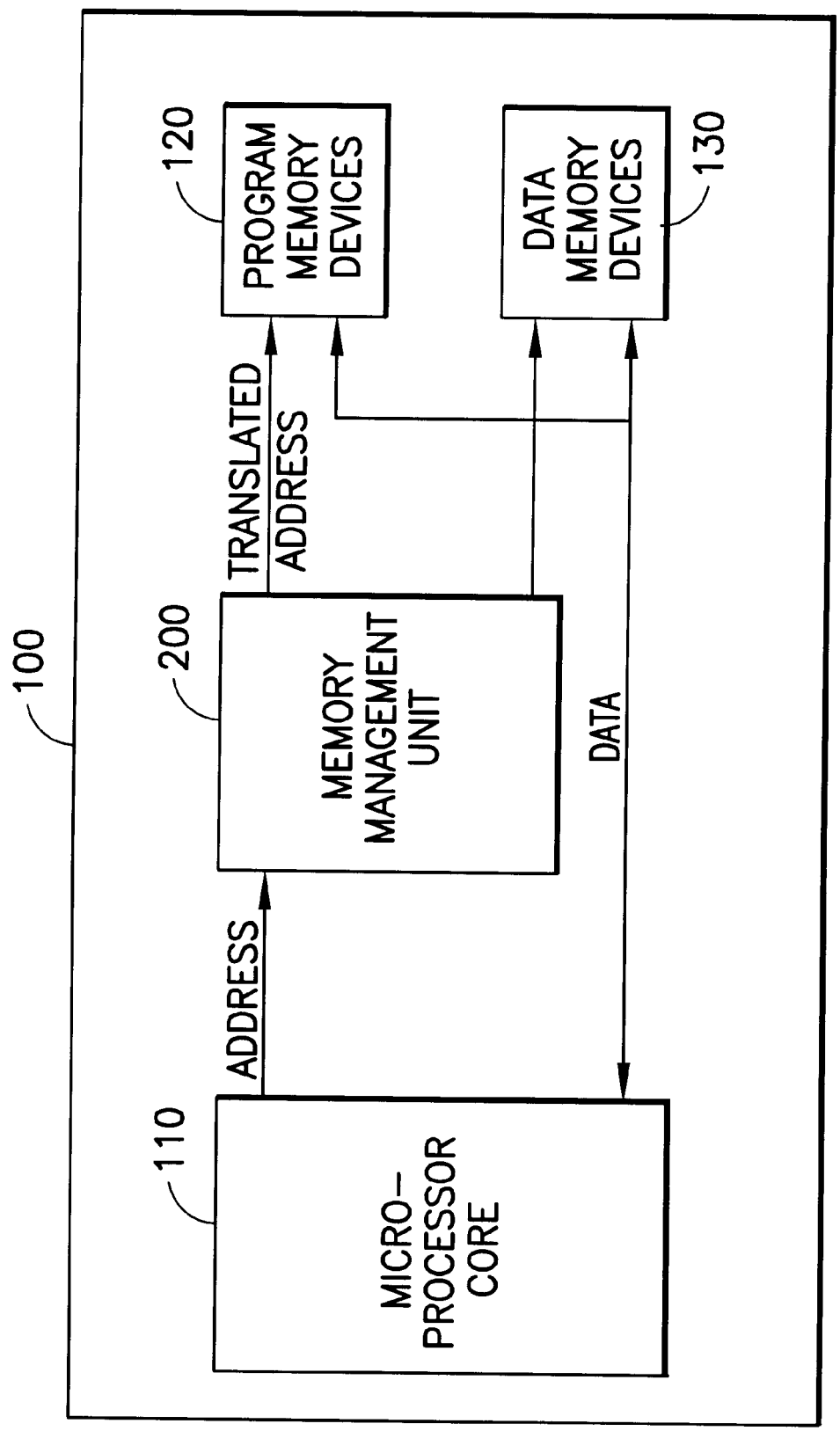
FIG. 1 is a schematic block diagram illustrating a single-chip data processing circuit, such as a smart card, that includes a memory management unit in accordance with the present invention.

FIG. 1 illustrates a single-chip data processing circuit 100, such as a smart card, that includes a microprocessor core 110, memory devices 120, 130 and a memory management unit 200 that interfaces between the microprocessor core 110 and the memory devices 120, 130 for memory access operations. In accordance with the present invention, the memory management unit 200 (i) partitions a homogeneous memory device to achieve heterogeneous memory characteristics for various regions of the memory device, and (ii) restricts access of installed applications executing in the microprocessor core 110 to predetermined memory ranges. It is noted that each of these two features are independent, and may be selectively and separately implemented in the memory management unit 200, as would be apparent to a person of ordinary skill. In addition, while the present invention is illustrated in a smart card environment, the present invention applies to any single-chip data processing circuit, as would be apparent to a person of ordinary skill in the art.

According to a feature of the present invention, the memory management unit 200, discussed further below in conjunction with FIG. 2, imposes firewalls between applications and thereby permits hardware checked partitioning of the memory. Thus, an application has limited access to only a predetermined memory range. As discussed further below, the memory management unit 200 performs memory address checking and translates addresses based on user-specified criteria.

According to another feature of the invention, the memory management unit 200 provides two operating modes for the microprocessor 110. In a secure kernel mode, the programmer can access all resources of the device including hardware control. In an application mode, the memory management unit 200 translates the virtual memory address used by the software creator into the physical address allocated to the application by the operating system in a secure kernel mode during installation. The present invention also ensures that an application does not access memory outside of the memory mapped to the application by the software when in secure kernel mode. Any illegal memory accesses attempted by an application will cause a trap, and in one embodiment, the memory management unit 200 restarts the microprocessor 10 in a secure kernel mode, optionally setting flags to permit a system programmer to implement an appropriate mechanism to deal with the exception.

In this manner, an exception is identified if an application is written with the accidental or specific intention of compromising the security of the smart card, by accessing stored data, code or by manipulating the hardware to indirectly influence the operation of the chip. The memory management unit 200 limits the application to the allocated program code and data areas. Any other references result in termination of the application and flagging the secure kernel that such an illegal attempt has been made. Thus, each application is isolated from all other applications, the hardware and the secure kernel. In an implementation where application isolation is not needed, the security mechanism acts as a general protection unit trapping software errors.

According to a further feature of the present invention, the memory management unit 200 partitions a homogeneous memory device, such as an FERAM memory device, to achieve heterogeneous memory characteristics normally associated with a plurality of memory technologies, such as volatile, non-volatile and program storage (ROM) memory segments. Once partitioned, the memory management unit 200 enforces the appropriate corresponding memory characteristics for each heterogeneous memory type.

Figure 2:
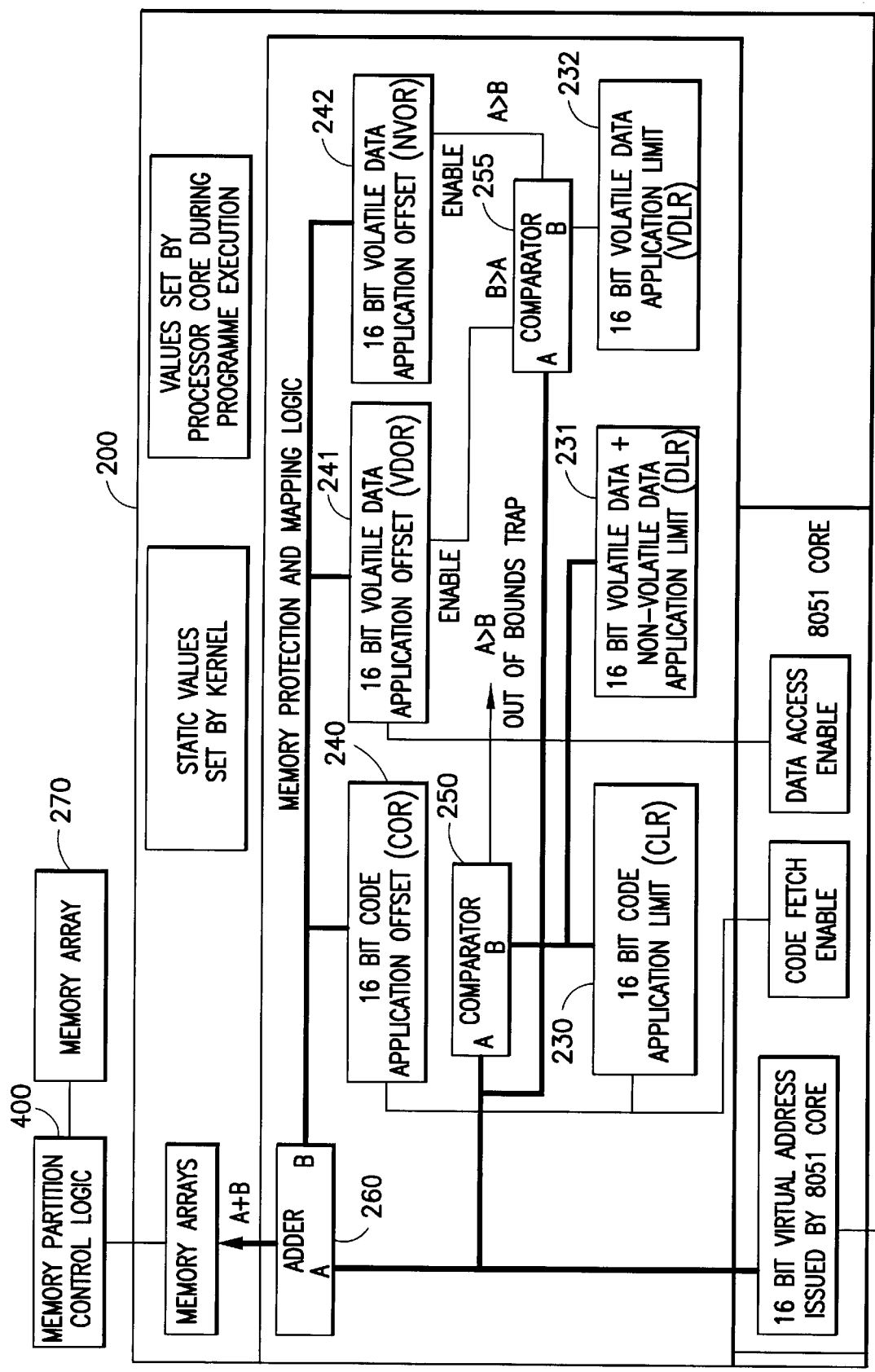
FIG. 2 is a schematic block diagram of an exemplary hardware-implementation of the memory management unit of FIG. 1.

FIG. 2 provides a schematic block diagram of an exemplary hardware-implementation of the memory management unit 200. As previously indicated, the memory management unit 200 (i) partitions a homogeneous memory device to achieve heterogeneous memory characteristics for various regions of the memory device, and (ii) restricts access of installed applications executing in the microprocessor core 110 to predetermined memory ranges. As shown in FIG. 2 and discussed further below in conjunction with FIG. 4, the memory management unit 200 includes a section for memory partition control logic 400. Generally, the memory partition control logic 400 is programmed with the required partitioning associated with each portion of the homogeneous memory in order that the homogeneous memory behaves like volatile, non-volatile and program storage (OTPROM) memory technologies, as desired. An application would normally be allocated different memory areas for code and data, and the data area can be further divided into a volatile portion, for scratch pad operations, and non-volatile storage areas.

In addition, the memory management unit 200 includes an application table 300, discussed further below in conjunction with FIG. 3. Generally, the application table 300 records the memory demands of each application that is installed on the single-chip data processing circuit 100. For example, the application table 300 indicates the volatile, non-volatile and program storage (OTPROM) memory requirements of each application. The application table 300 is generated by the microprocessor 110 when operating in a secure kernel mode, as each application is installed. The kernel allocates the appropriate memory areas to each application program.

Once the appropriate memory areas have been allocated to each application program, the memory management unit 200 shown in FIG. 2 can load the limit and offset registers 230–232, 240–242, discussed below, with the appropriate values from the application table 300 to ensure that the executing application only accesses the designated memory locations. Generally, the memory management unit 200 implements memory address checking using the limit registers 230–232 and translates addresses to an absolute memory address using the offset registers 240–242.

In addition to restricting access of installed applications executing in the microprocessor core 110 to predetermined memory ranges, the memory management unit 200 also translates addresses between the virtual memory address used by the software programmer into the physical address allocated to the application by the operating system in a secure kernel mode, before it hands over execution to the application code. It is noted that when programming the illustrative 8051 microprocessor, a software programmer starts with a code space starting at an address of 0, and a data space starting at an address of 0. Furthermore, the size of the code and data space is a variable corresponding to the required resource of a given application.

Again, the application has the appropriate volatile, non-volatile and program storage (OTPROM) memory allocations that are translated and checked by the memory management unit 200, in a manner described below, such that attempts to access memory outside the designated memory area will result in the application being terminated. The kernel will be restarted and the offending trapped access, being stored for interrogation by the kernel.

The hardware memory-mapping scheme and out of area protection hardware mechanism is shown in FIG. 2. In the illustrative 8051 microprocessor, only one application is active at any time, so only one set of mapping logic is required, as shown in FIG. 2. Thus, the microprocessor core 110 must implement context switching in a multi-function environment, as would be apparent to a person of ordinary skill. As previously indicated, the memory management unit 200 includes a pair of limit and offset registers, such as the registers 230–232, 240–242, respectively, for each memory technology that is managed by the memory management unit 200.

Before an application is started, the associated memory requirements are retrieved from the application table 300 by the secure operating system running in the kernel mode. The associated memory requirements are loaded into the corresponding limit and offset registers 230–232, 240–242.

Thereafter, the kernel loads the code application offset register (COR) 240 with the address of where the application program code is stored in memory. The kernel then loads the code application limit register (CLR) 230 with the size of the application code space. Similarly, the data space can be defined as a block of memory, whose size is the sum of the sizes of both the volatile and non-volatile memory, allocated to that application. Thus, the kernel loads the data limit register (DLR) 231 with the size of the data space (both the volatile and nonvolatile memory). The size of the allocated volatile memory is loaded into the volatile data limit register (VDLR) 232, and the base address to be used for the scratch pad memory (RAM) is loaded into the volatile data offset register (VDOR) 241. Finally, the base address to be used for non-volatile storage (EEPROM) allocated to the application is loaded into the non volatile offset register (NVOR) 242.

In one implementation, the memory protection mechanism checks the virtual memory addresses assigned by the programmer, as opposed to the absolute addresses allocated by the kernel. Thus, the illegal access mechanism is simplified, as an illegal memory access is identified when an access is made to a location having a virtual address that is greater than the value contained in the appropriate limit register. Thus, as shown in FIG. 2, the memory management unit 200 contains comparators 250, 255 for comparing the virtual address issued by the microprocessor core 210, to the value contained in the appropriate limit register 230–232. If the application is attempting an unauthorized memory access, the corresponding comparator 250, 255 will set an out-of-bounds trap.

If the application is attempting an authorized memory access, the corresponding comparator 250, 255 will enable the appropriate offset register 240–242, and the value from the offset register will be added by an adder 260 to the virtual address issued by the microprocessor core 210. In one preferred implementation, the limit and offset registers 230–232, 240–242 and the comparators 250, 255 are fabricated using known tamper-resistant technologies to preclude physical security attack.

Figure 3:
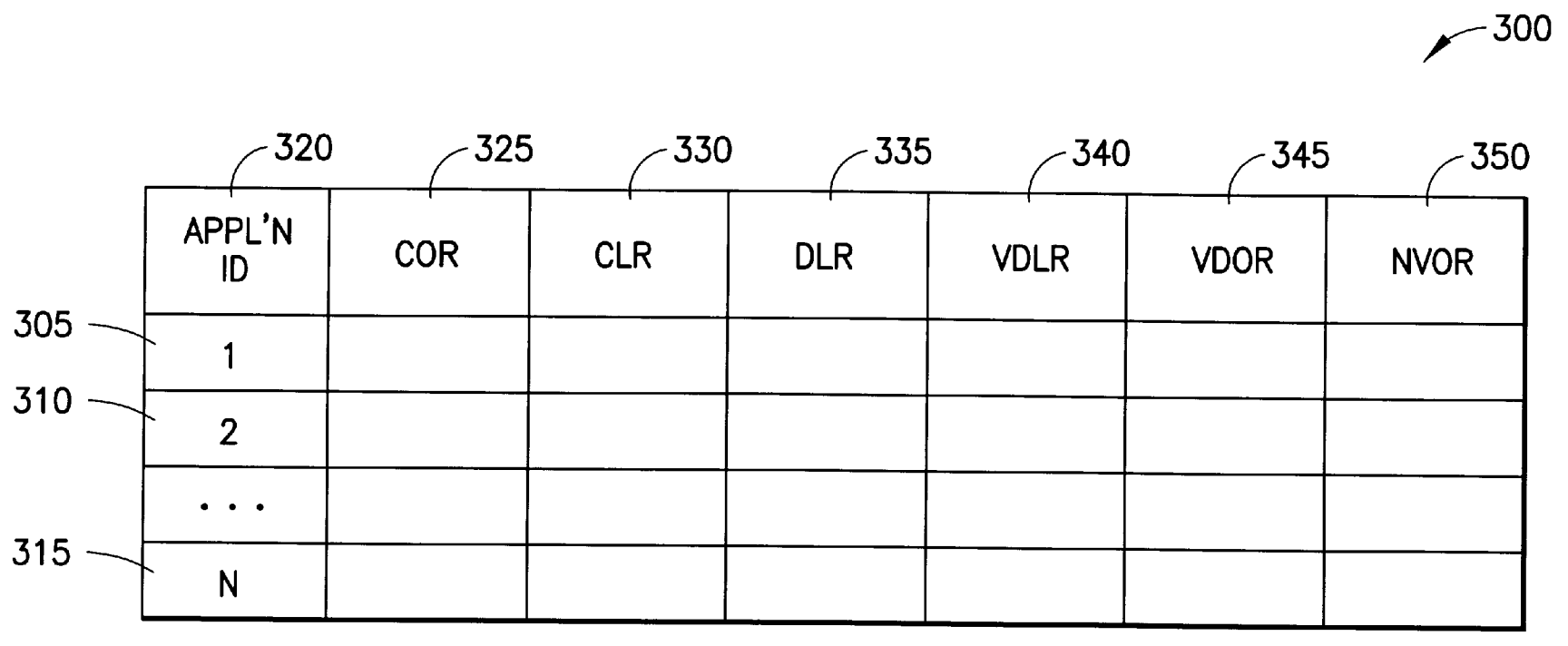

FIG. 3 illustrates an exemplary application table 300 that stores information on each application installed on the single-chip data processing circuit 100, including the memory demands of each installed application. As shown in FIG. 3, the application table 300 indicates the volatile, non-volatile and program storage (OTPROM) memory requirements of each application. The application table 300 may be generated by the microprocessor 110 when operating in a secure kernel mode, as each application is installed. The kernel allocates the appropriate memory areas to each application program.

The application table 300 maintains a plurality of records, such as records 305–315, each associated with a different application. For each application identifier in field 320, the application table 300 includes the base address of where the application program code is stored in memory, and the corresponding size of the application code space in fields 325 and 330, respectively. In addition, the application table 300 indicates the total size of the data space in field 335 (sum of both the volatile and non-volatile memory), with the size of the allocated volatile memory stored in field 340, the base address for the scratch pad memory (RAM) in field 345, and the base address for non-volatile storage (EEPROM) is recorded in field 350. As previously indicated, when an application becomes active, each of the corresponding memory range values from fields 325 through 350 are retrieved and loaded into the appropriate limit and offset registers 230–232, 240–242, respectively.

Figure 4:
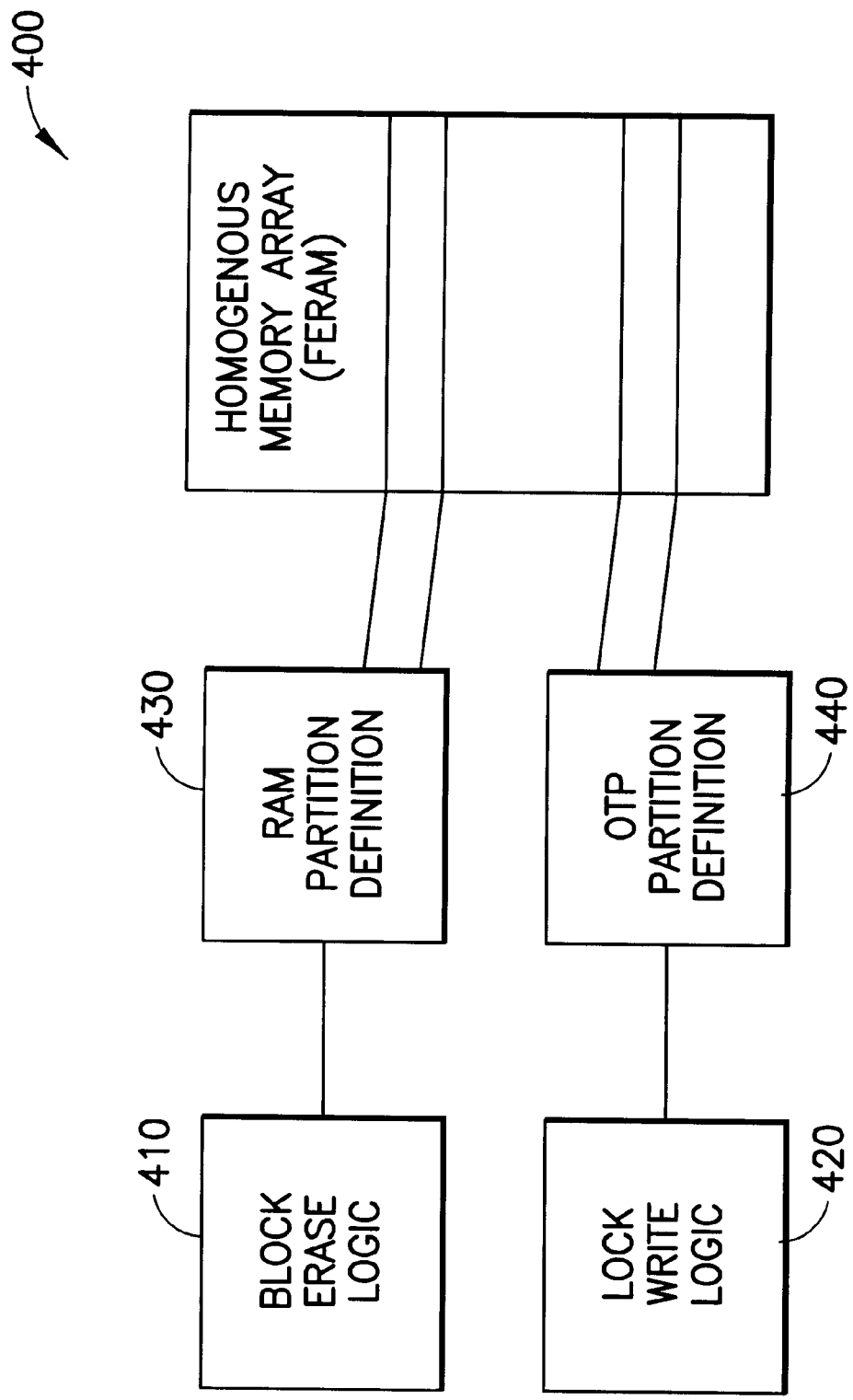
FIG. 4 is a schematic block diagram illustrating the memory partition control logic of FIG. 2.

FIG. 4 illustrates the memory partition control logic 400 for a homogeneous memory array 450. As previously indicated, the memory partition control logic 400 contains registers associated with each portion of the homogeneous memory in order that the homogeneous memory behaves like volatile, non-volatile and program storage (OTPROM) memory technologies, as desired. An application would normally be allocated different memory areas for code and data, and the data area can be further divided into a volatile portion, for scratchpad operations, and non-volatile storage areas. FERAM is inherently a non-volatile array. In other words, FERAM can be changed many times and holds the last written value, even when powered down, in a manner similar to EEPROM. Thus, it is unnecessary to force EEPROM-behavior onto the FERAM to achieve a non-volatile array.

To create a volatile array using the non-volatile FERAM array, erase circuitry 410, 430 is added, for example, by writing 0's to each address, or using a block erase feature built into the array that writes 0's to many addresses in parallel. The erase circuitry 410, 430 records the upper and lower limits of the memory range that should behave like a volatile array. Similarly, to ensure that the code is not written to, a write inhibit has to be forced onto the memory array using lock-write circuitry 420, 440. The lock-write circuitry 420, 440 records the upper and lower limits of the memory range that should behave like program storage (OTPROM) memory.

Once the application space has been setup by the secure kernel, defined areas of the homogeneous array need to behave in the appropriate manner. This can be achieved by mapping the erase logic using the same memory definitions used to define the volatile memory area for applications. Before an application is started (or after or both), the erase mechanism is enabled, ensuring that an application when started can see no residual values left over by a previous application or the kernel, that may have used the designated block. Similarly, the same simple mechanism can be used to enforce a write-lock on the area designated as the code space for the application to prevent the application from modifying its code to cause potential unknown conditions and hence revealing secure aspects of the device.

The application RAM area is defined by parameters loaded into erase circuitry 430. Typically, the value loaded into the erase circuitry 430 would be the physical address location within the FERAM memory array and the size of the allocated memory. The block erase logic 410, when activated, is constrained by the erase circuitry 430 to erase the predefined area. The same principle is used to obtain OTP characteristics. OTP partitioning is defined by the lock-write circuitry 440, which allocates an area of the same memory array once parameters are loaded. The lock write logic 420 removes the write capability for the area defined in the lock-write circuitry 440 giving the area the same characteristics as OTP memory.

It is to be understood that the embodiments and variations shown and described herein are merely illustrative of the principles of this invention and that various modifications may be implemented by those skilled in the art without departing from the scope and spirit of the invention.

I claim:

1. a single-chip data processing circuit, comprising:
   a processor for executing a plurality of applications;
   a homogeneous memory device; and
   a memory management unit for (i) partitioning said homogeneous memory device for each of said plurality of applications to achieve memory characteristics associated with a plurality of memory technologies, including a volatile memory technology, (ii) recording for each of said applications a range for an assigned heterogeneous memory type corresponding to each of said partitions, and (iii) enforcing memory characteristics for a heterogeneous memory type corresponding to each of said partitions for each of said applications.

2. The single-chip data processing circuit of claim 1, wherein said memory technologies include a read only memory technology with limited programmability.

3. The single-chip data processing circuit of claim 1, wherein said memory technologies include a non-volatile memory technology.

4. The single-chip data processing circuit of claim 1, wherein said memory management unit includes block erase logic to achieve volatile memory characteristics.

5. The single-chip data processing circuit of claim 1, wherein said memory management unit includes lock-write erase logic to achieve memory characteristics with limited programmability.

6. The single-chip data processing circuit of claim 1, wherein said memory management unit further comprises a register for storing a base memory address corresponding to a location where a non-volatile memory region begins.

7. The single-chip data processing circuit of claim 1, wherein said memory management unit further comprises a register for storing a memory address corresponding to a location where a non-volatile memory region ends.

8. The single-chip data processing circuit of claim 1, wherein said memory management unit further comprises a register for storing a base memory address corresponding to a location where a volatile memory region begins.

9. The single-chip data processing circuit of claim 1, wherein said memory management unit further comprises a register for storing a memory address corresponding to a location where a volatile memory region ends.

10. A method for partitioning a homogeneous memory device to achieve heterogeneous memory characteristics for various regions of the memory device for a plurality of applications, comprising the steps of:
    partitioning said homogeneous memory device to achieve memory characteristics associated with a plurality of memory technologies, including a volatile memory technology;
    recording for each of said applications a range for an assigned heterogeneous memory type corresponding to each of said partitions; and
    enforcing memory characteristics for a heterogeneous memory type corresponding to each of said partitions for each of said applications.

11. The method of claim 10, wherein said memory technologies include a read only memory technology with limited programmability.

12. The method of claim 10, wherein said memory technologies include a non-volatile memory technology.

13. The method of claim 10, further comprising the step of erasing a partition of said homogeneous memory device to achieve volatile memory characteristics.

14. The method of claim 10, further comprising the step of preventing write operations in a partition to achieve memory characteristics with limited programmability.

15. The method of claim 10, further comprising the step of storing a base memory address corresponding to a location where a non-volatile memory region begins.

16. The method of claim 10, further comprising the step of storing a memory address corresponding to a location where a non-volatile memory region ends.

17. The method of claim 10, further comprising the step of storing a base memory address corresponding to a location where a volatile memory region begins.

18. The method of claim 10, further comprising the step of storing a memory address corresponding to a location where a volatile memory region ends.

* * * * *